United States Patent [19]

Mace, Jr. et al.

[11] Patent Number: 5,313,745
[45] Date of Patent: May 24, 1994

[54] TREAD EDGE GRINDING METHOD AND APPARATUS

[75] Inventors: Carl L. Mace, Jr., Rockwall, Tex.; William A. Rex, Mogadore; Lawrence E. Chlebina, Akron, both of Ohio

[73] Assignee: The Goodyear Tire & Rubber Company, Akron, Ohio

[21] Appl. No.: 6,915

[22] Filed: Jan. 21, 1993

[51] Int. Cl.$^5$ .............................................. B24B 1/00
[52] U.S. Cl. ................... 51/326; 51/281 R; 51/87 R; 51/290
[58] Field of Search ............... 51/281 R, 281 P, 290, 51/326, DIG. 33, 104, 106 R, 132, 87, 88, 89, 117, 118; 157/13

[56] References Cited

U.S. PATENT DOCUMENTS

| | | | |
|---|---|---|---|
| 708,967 | 9/1902 | Miller et al. | 51/87 R |
| 736,239 | 8/1903 | Ellinwood | 51/87 R |
| 2,321,936 | 6/1943 | Pollock | 29/76 |
| 2,597,256 | 5/1952 | Murray | 51/148 |
| 2,864,445 | 12/1958 | Hawkinson | 164/10.2 |
| 2,915,113 | 12/1959 | Van Sickle et al. | 157/13 |
| 2,939,520 | 6/1960 | Frohlich et al. | 157/13 |
| 3,478,804 | 11/1969 | Meixner | 157/13 |
| 3,841,033 | 10/1974 | Appleby et al. | 51/289 R |
| 3,867,792 | 2/1975 | Pelletier | 51/33 W |
| 3,877,506 | 4/1975 | Mattox et al. | 157/13 |
| 3,910,337 | 10/1975 | Pelletier | 157/13 |
| 3,925,129 | 12/1975 | Blankenship | 156/96 |
| 3,953,915 | 4/1976 | Fawcett et al. | 29/105 R |
| 3,953,942 | 5/1976 | Nisimura | 51/33 W |
| 3,976,532 | 8/1976 | Barefoot | 156/405 |
| 3,987,834 | 10/1976 | Hopple et al. | 157/13 |
| 4,036,677 | 7/1977 | Marangoni | 156/394 |
| 4,116,256 | 9/1978 | Morris et al. | 157/13 |
| 4,268,998 | 5/1981 | Hansen | 51/148 |
| 4,490,197 | 12/1984 | Bajer | 156/64 |
| 5,179,806 | 1/1993 | Brown et al. | 51/89 |
| 5,185,960 | 2/1993 | Majerus et al. | 51/104 |

FOREIGN PATENT DOCUMENTS 0130759  1/1985  European Pat. Off. .
1139480  7/1957  France .
0700399  12/1953  United Kingdom ............... 157/13

Primary Examiner—Robert A. Rose
Attorney, Agent, or Firm—David L. King

[57] ABSTRACT

A method and apparatus (10) for grinding the edge of a precured tread (100) is described. The method for removing material from and shaping an edge of a precured tread comprises the steps of:
a) placing the edge of the tread in a V-shaped groove of a grinding wheel;
b) rotating the grinding wheel while it is in contact with the tread edge; and
c) moving the tread and grinding wheel relative to one another, the movement being in a direction causing the edge of the tread to be ground to move through the groove in the grinding wheel. The preferred method comprises mounting a winged tread on an apparatus (10) capable of grinding the wing tip of the tread, the apparatus (10) buffing the tread wing (108) such that the wing tip (110) is ground along axially inner and outer surfaces (112,114) a radial distance of at least 5 mm about the circumferential extent of the wing, wherein the inner and outer surfaces (112,114) of the wing tip are ground to form two surfaces that intersect.

17 Claims, 8 Drawing Sheets

TREAD EDGE GRINDING METHOD AND APPARATUS

BACKGROUND OF THE INVENTION

This invention relates to an improved method and apparatus for grinding a tread edge or wing tip to remove material from, roughen, and shape its surface.

In the mounting of treads on a used tire casing, it is known in the art to buff the surface of the casing, removing the worn tread and roughening the remaining surface. This roughening of the casing improves the adhesion of a cushion layer of unvulcanized rubber which is cemented to the casing. The tread rubber is layered on and cemented to the cushion layer. This assembly is then cured. A similar procedure may be employed in applying a precured tread to a new tire cured casing. A new tire casing would be buffed in the crown region, without requiring the removal of the tread.

It has been determined that a roughening of a casing-contacting precured tread surface prior to cementing to the cushion layer improves the tread adhesion. The roughening procedure, commonly called buffing, is generally accomplished by the use of wire wheels. The wheels remove oxidized rubber and increase the surface area to be bonded, thus improving adhesion characteristics. Conventional buffing of the casing and the precured tread were directed circumferentially creating minute grooves around the circumferential surface of the tread and the casing.

With regard to winged treads, trials have shown that circumferentially buffing at the inner curvature of the wing did not produce a uniform buff. Uniformity of buffing being important to bond quality required that an alternative method be developed. Such a method was described in U.S. patent application Ser. No. 07/833,208.

It was the purpose of that invention to provide a method and apparatus for buffing a precured tread wherein the resulting roughened tread surface provided a means for improved air evacuation and an improved bond. This was accomplished by insuring that at least a portion of the roughened grooves terminated at the tread edges, thus providing a means for air evacuation.

It was a further purpose of that invention to describe and illustrate a method and apparatus for uniformly buffing a precured wing tread whereby the inner surfaces of the wings were uniformly roughened such that the grooves extended to a tread edge.

An improvement over the method described in U.S. patent application Ser. No. 07/833,208 has been discovered. A new method of grinding the inner and outer surfaces of the wing tip or edge of a precured tread can greatly reduce the potential of wing or edge lifting from the casing.

OTHER RELATED ART

Hopple, in U.S. Pat. No. 3,987,834, issued Oct. 26, 1976, illustrates a Tire Buffing Apparatus and Method. The patent shows the concept of removing the tread rubber from a tire and roughening the casing surface.

Morris, in U.S. Pat. No. 4,116,256, issued Sep. 26, 1978, also shows an apparatus for preparing the peripheral surface of a tire casing. The apparatus illustrates the use of a pivotal tire mount such that circumferential buffing of the casing can be accomplished across the tread to the shoulder region of the casing.

Neal, in U.S. Pat. No. 4,008,521, issued May 9, 1978, describes a method of retreading a tire with an endless premolded tread wherein the inner surface of the tread is buffed prior to being mounted to the casing.

Bajer, in U.S. Pat. No. 4,490,197, issued Dec. 25, 1984, also shows a tire casing buffing apparatus.

Schelkmann, in British Patent No. 1,552,841, filed Oct. 7, 1976, illustrates a tread molded with a network of passages to assist in the evacuation of gaseous inclusions between the tread internal surfaces and the layer of bonding rubber on the prepared tire carcass. This patent further describes a method of coating the internal surface of the tread with unsaturated rubber to prevent deterioration of the tread internal surfaces during storage.

Blankenship, in U.S. Pat. No. 3,925,129, issued Dec. 9, 1975, describes a tire retreading system utilizing a tread strip. The patent emphasizes the importance of removal of trapped air.

SUMMARY OF THE INVENTION

The method for removing material from and shaping an edge of a precured tread comprises the steps of:

a) placing the edge of the tread in a V-shaped groove of a grinding wheel;

b) rotating the grinding wheel while it is in contact with the tread edge; and c) moving the tread and grinding wheel relative to one another, the movement being in a direction causing the edge of the tread to be ground to move through the groove in the grinding wheel. The method of grinding a winged precured tire tread (100) according to the present invention comprises providing an apparatus (10) capable of grinding the wing tip (110) of the tread wing (108) such that surfaces (112,114) formed by the grinding angularly intersect, mounting the tread in the apparatus, and grinding. The tread may be provided in an annular configuration, an arcuate strip, or a flat strip.

In the illustrated preferred embodiment, the method of grinding the wing tip (110) may be employed by turning an annular tread (100) inside out such that the radially inner casing engaging (102) surface of the tread (100) is radially outward and the ground engaging tread surface (101) is radially inward. The tread (100) is mounted over an axially rotatable drum (60) and a tension mechanism (200) such that the tread (100) is centered on and supported by the drum (60). The mounted tread (100) is placed in tension by stretching the tread (100) to a predetermined circumferential length. The drum (60) is then rotated at a predetermined angular velocity. The casing engaging surface (102) of the tread can be buffed as described in U.S. patent application Ser. No. 07/833,208, now U.S. Pat. No. 5,185,960. A tread buffing wheel (51) is axially rotated to a predetermined angular velocity. The buffing wheel (51) is then placed in contact with the rotating tread (100), the buffing wheel (51) axis of rotation being aligned relative to the axis of rotation of the drum. The internal surface of the tread is buffed to a predetermined roughness with some of the grooves formed by wing buffing means 80, these grooves extending axially toward a tread edge. The method characterized in that the wing tips (110) are ground in the following manner, first a pair of guides (72) engage the axial exterior surfaces (104,106) of the tread (100), then a pair of rotating grinding wheels (77,78) engage each wing tip (110) thereby grinding the tips (110) sufficiently such that the inner and outer surfaces (112,114) of the wing tip (110) intersect and are roughened. The rotating grinding wheels (77,78) are then removed from tread contact. The tread (100) is removed from the drum (60) and tension mechanism (200), and a bonding cement is applied to the buffed and ground surfaces of the tread (100). The cemented surfaces are then covered with a polyethylene liner, and the ground contacting tread surfaces are then turned radially outward.

Although the illustrated apparatus (10) is capable of simultaneously buffing the casing contacting tread surface and grinding the wing tips (110), it is understood that separate apparatus can be employed to accomplish the same process results.

A preferred apparatus (10) for buffing an annular tread (100) according to the present invention, comprises a frame (21), a means (60) for supporting the tread, a means for stretching the tread (200), a center tread buffing means (50), a main drive motor, a pair of tread edge buffing means (81,82), and a means for rotating the tread edge buffing means (90A,90B). The means (60) for supporting the tread (100) is axially rotatable and mounted to the frame. The means (200) for stretching the tread is axially rotatable and has an axis of rotation parallel to the axis of rotation of the means (60) for supporting the tread. The center tread buffing means (50) has a curved surface capable of being brought into contact with the tread (100) for buffing a radially inner casing engaging tread surface (102). The buffing produces circumferentially extending minute grooves or brush marks of substantially even depth. The main drive means for rotating the mounted tread (100) about one or more axis also rotates the center tread buffing means (50). The pair of edge buffing means (81,82) buff the edges of the tread (100) with minute grooves or brush marks that are of substantially even depth and extend axially outward. The edge buffing means (81,82) are rotated by the means (90A,90B) for rotating the edge buffing means. The wing tip or edge grinding means (70) comprises a guide means (72) for positioning the edge or wing and supporting the tread, two pairs of grinding wheels (77,78), the rotating edge or wing tip grinding wheels (77,78) being brought into contact with the edge or wing tip (110), thereby grinding the axially inner and outer surfaces (112,114) of the edge or wing tip (110) shaping and forming the surfaces such that at least one surface is chamfered intersecting the other surface.

Definitions

"Axial" and "axially" means lines or directions that are parallel to the axis of rotation of the tire.

"Buffed" means a procedure whereby the surface of an elastomeric tread or casing is roughened. The roughening removes oxidized material and permits better bonding.

"Center plane" means the plane perpendicular to the axis of rotation of the tread and passing through the axial center of the tread.

"Casing" means the carcass, belt structure, beads, sidewalls, and all other components of the tire including a layer of unvulcanized rubber to facilitate the assembly of the tread, the tread and undertread being excluded. The casing may be new, unvulcanized rubber or previously vulcanized rubber to be fitted with a new tread.

"Equatorial plane (EP)" means the plane perpendicular to the tire's axis of rotation and passing through the center of its tread;

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load.

"Radial" and "radially" means directions radially toward or away from the axis of rotation of the tire;

"Replacement tread" as used herein refers to a premolded and precured tread.

"Retreading" means the procedure of refurbishing a tread worn tire by removing the old tread and replacing it with a precured tread or a "hot capped" tread.

"Tread" means a molded rubber component which, when bonded to a tire casing, includes that portion of the tire which comes into contact with the road when the tire is normally inflated and under normal load.

"Wings" means the radial inward extension of the tread located at axial extremes of the tread, the inner surface of the wing being an extension of the inner casing contacting surface of the tread.

DETAILED DESCRIPTION OF THE INVENTION

Figure 1:
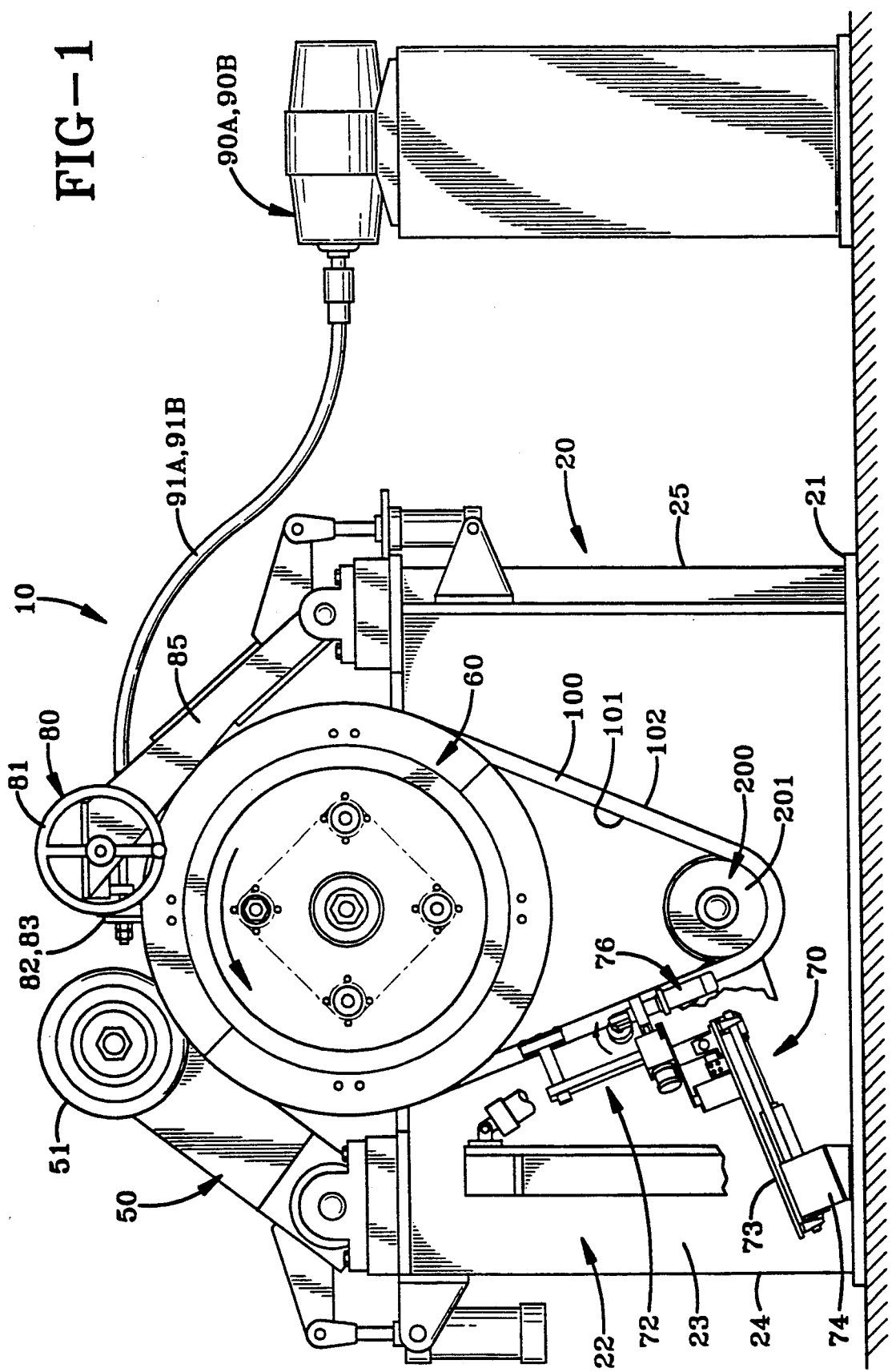
FIG. 1 illustrates a side view of the tread mounted on the preferred embodiment buffing and grinding apparatus.

FIGS. 1 through 6 illustrate the preferred embodiment apparatus 10. The basic apparatus is similar to the apparatus disclosed in U.S. patent application Ser. No. 07/833,208, now U.S. Pat. No. 5,185,960, incorporated herein by reference. The illustrated apparatus is particularly adapted to buff and grind precured winged treads of an annular configuration. The method and apparatus as described is also suitable for grinding the edge of a flat tread or strip of tread of precured rubber with or without wings.

The apparatus 10 as illustrated has a tread support drum 60 and a tension roller assembly 200. Mounted onto the drum 60 and the tension roller assembly 200 is an annular precured wing tread 100. The tread 100, when mounted to the apparatus 10, is turned inside out such that the ground contacting surface 101 is facing radially inward and the casing engaging surface 102 is radially outwardly facing. The apparatus has a center tread buffer assembly 50 and a wing or edge buffer assembly 80. The support drum 60 and the center tread buffer assembly 50 are driven by a main drive motor (not illustrated). A speed rotation reduction is accomplished such that the drum 60 rotates at an angular velocity or rpm substantially less than the center tread buffing assembly 50.

Also pivotally mounted to the enclosure 22 is the wing or edge buffing assembly 80. The buffing assembly 80 buffs the inner surface 111 of the wing or edge, the wing inner tread surface 111 being an axial extension of the tread inner surface 102 and including the tread edge. The wing buffer assembly 80 is powered by two 7½ hp motors 90A and 90B (shown in FIG. 1). The motors are connected to the buffer assembly 80 by two drive shafts 91A and 91B.

The tread 100 is shown mounted over the tread support drum 60 and a tension roller assembly 200. The tension roller assembly 200 is pivotally attached to the enclosure 22. The tension roller 201 is pivoted by actuating a cylinder. As the cylinder extends, the tension roller 201 axis of rotation is moved, increasing the distance between the axis of rotation of the drum 60 and the tension roller 201 axis. This relative movement increases the tension on the tread 100.

The center tread buffing wheel 51 is rotated in a counterclockwise rotation while the tread 100 is slowly rotated in a counterclockwise direction. The center tread buffing wheel 51 roughens the inner tread surface 102 creating visually observable circumferential grooves. The wing or edge buffing assembly 80 has two oppositely rotating wing or edge buffing wheels 82 and 83, respectively. These wheels are rotated in opposite directions such that the wing's inner surfaces 102 are buffed under a tensile scrubbing action. The wing wheels 82,83 are mounted to a second support arm 85. The wing wheels 82,83 are axially movable and are spaced equidistant from the equatorial plane of the drum 60. The wing wheels 82,83 have an axis of rotation perpendicular to the axis of rotation of the drum 60. The wing wheels 82,83 can be axially moved by turning a wing buffer axial adjustment unit 81.

When buffing a tread, the wing adjustment unit 81 is turned until the wing wheels 82,83 make firm contact with the tread 100. The buffing action of the lines along the tread's inner surface 102, whereas the wing buffing action creates lines that extend outwardly relative to the centerplane of the tread from the wing inner surfaces towards a tread edge. These wing buffing lines create small air passages that assist in the evacuation of trapped air when the tread is mounted to a prepared tire casing.

The apparatus as described above is as disclosed in U.S. patent application Ser. No. 07/833,208 now U.S. Pat. No. 5,185,960. In addition to the apparatus as described above, there is included a wing tip or edge grinding means 70.

Figure 2:
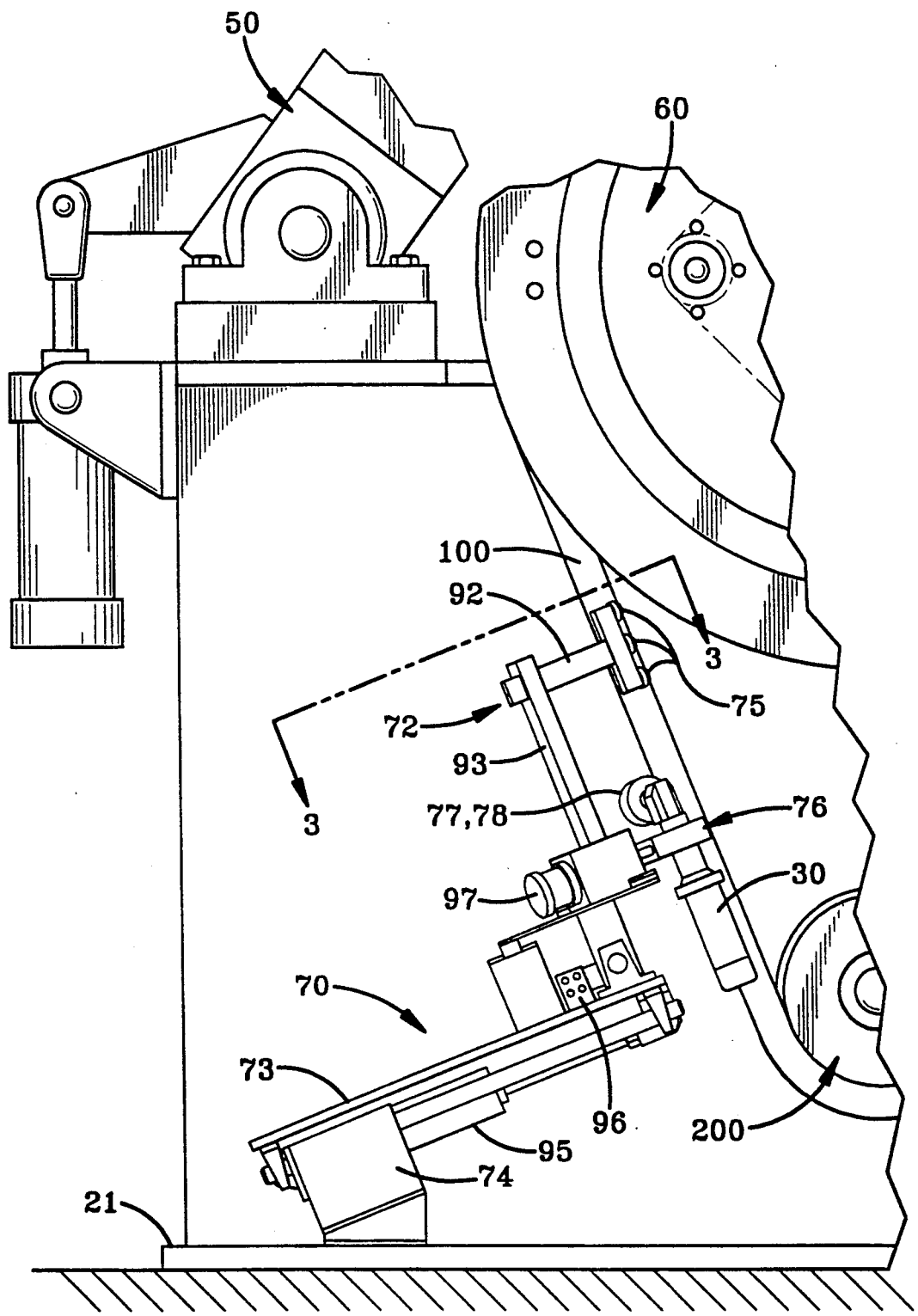
FIG. 2 illustrates a view specifically highlighting the wing tip grinding means.
Figure 3:
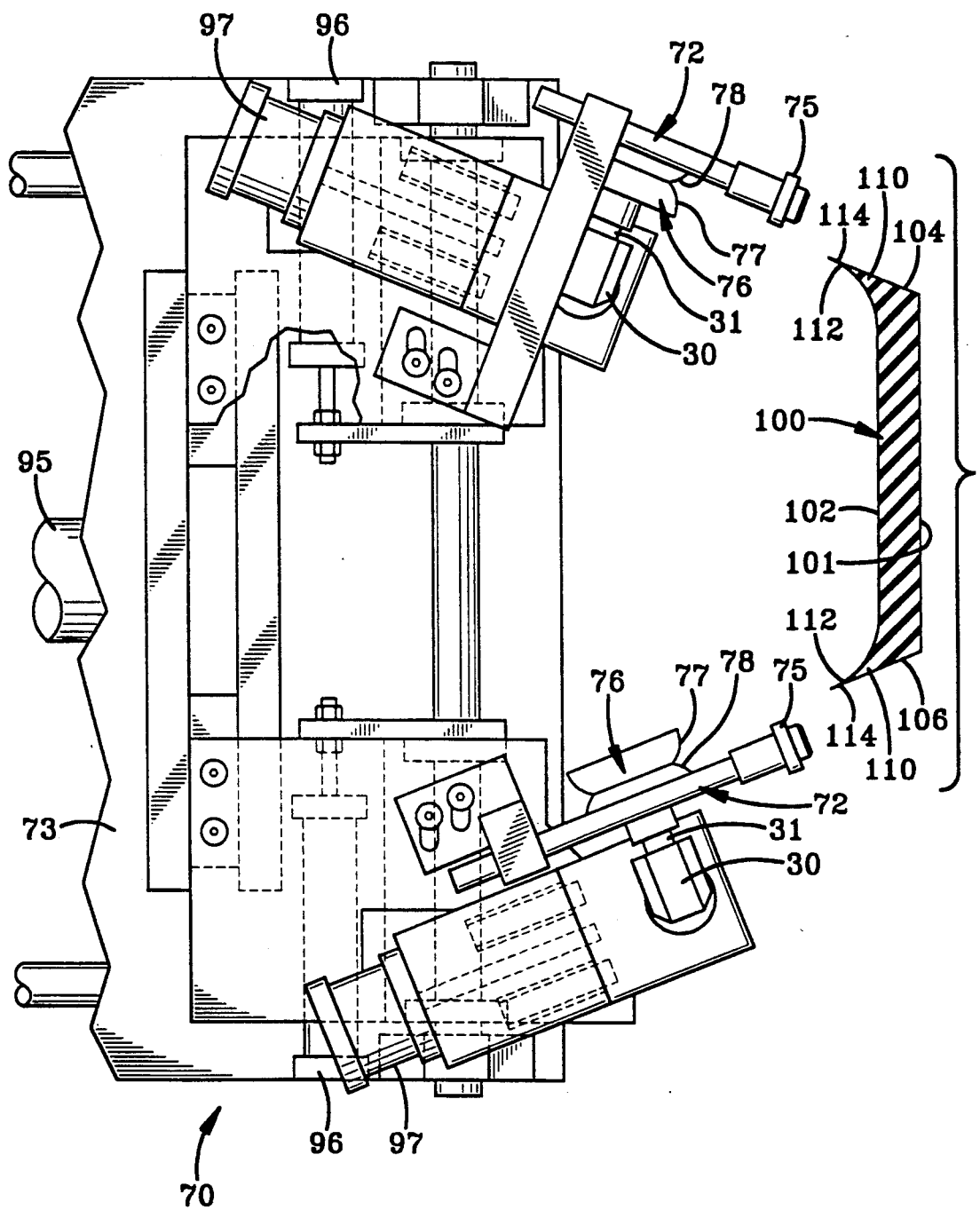
FIG. 3 is a view taken along lines 3—3 of FIG. 2 illustrating the guide means and the grinding means in the retracted position relative to the tread.
Figure 5:
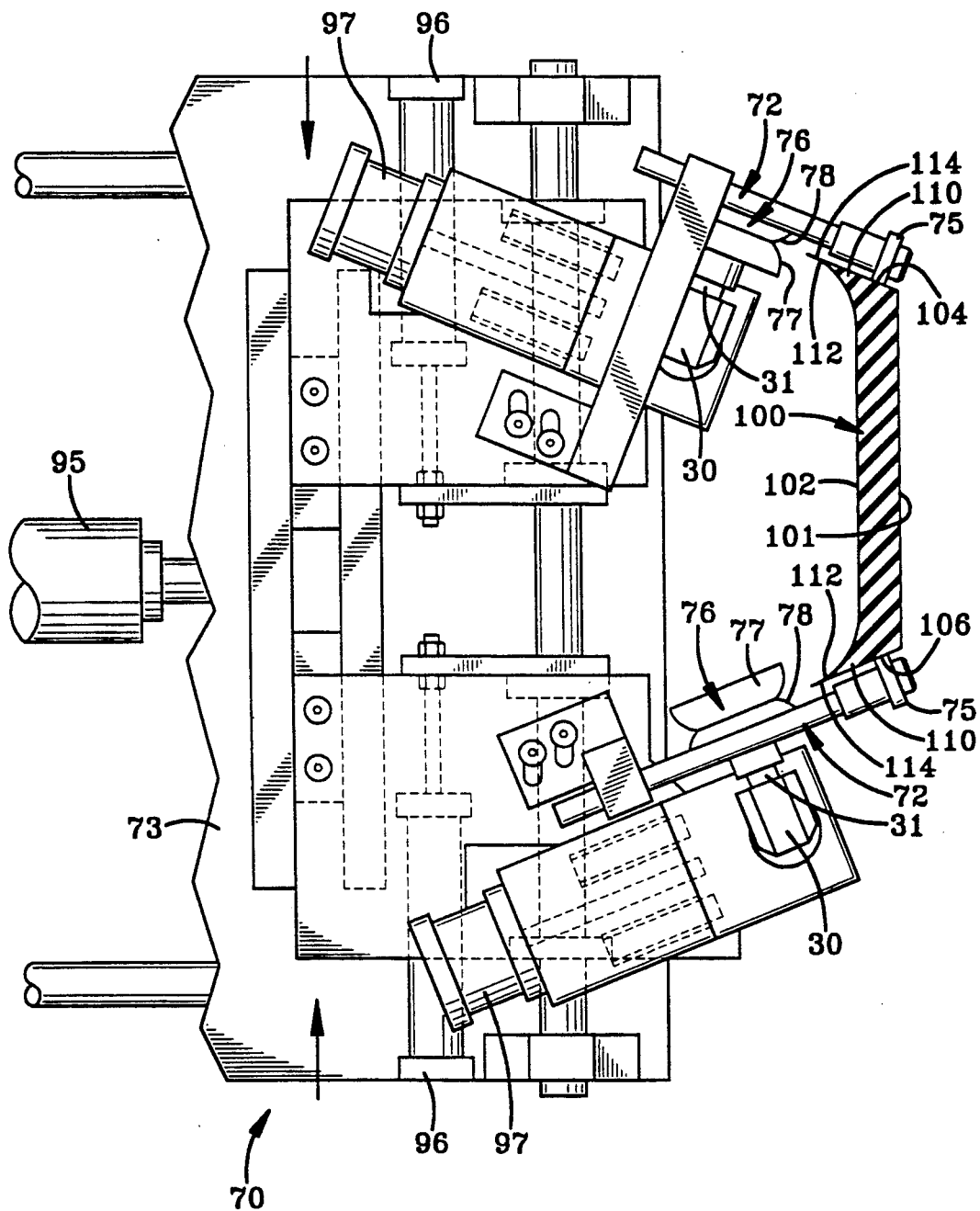
FIG. 5 is a view similar to FIG. 4 showing the guide means extended and moved into the tread contacting position.

The wing tip or edge grinding means 70 has a bracket 74 welded to the frame base 21, attached to the bracket is a support arm 73. The support arm 73 as illustrated is inclined relative to the frame base 21 such that the support arm 73 is about perpendicular to the portion of mounted tread 100 nearest to it. Attached to the support arm is a pair of slidably attached guide means 72. Each slidable guide means 72 as illustrated in FIG. 2 are positioned forward of a wing tip or edge grinder 76. The guide means 72 is designed to slide generally radially toward or away relative to the tread 100. When extended toward the tread 100, the guide means 72 can be slidably advanced or retracted generally laterally toward or away from the tread. As illustrated, there is one guide means 72 and one wing tip or edge grinder 76 located on each side of the tread 100. The guide means 72 includes at least three rollers 75 attached to a rod 92. Preferably five rollers are employed. The rollers are free to spin. The rod 92 is rigidly fixed to the bracketry 93 but can be adjusted to increase or decrease the amount of linear extension of the guide rollers 75. This adjustment can increase or decrease the position of the wing tip 110 or edge relative to the grinding wheels 77,78. The guide means 72 rollers 75 contact the tread at the shoulder or axial exterior surfaces of the tread. There shoulder surfaces 104,106 are inclined slightly such that as the rollers 75 contact the tread 100, they laterally constrain the tread 100 as well as radially resist or limit the tread from moving away from the grinding wheels 77,78 as can be seen in FIG. 5. The slidable movement of the guide means 72 and the grinding wheels 77,78 are affected by the actuation or the cylinders 95,96,97. These cylinders 95,96,97 are attached to the associated bracketry 73 and upon actuation, they extend or retract, thereby achieving the desired relative movements of the guide means 72 and the grinding means 76 toward or away from the tread 100.

Figure 4:
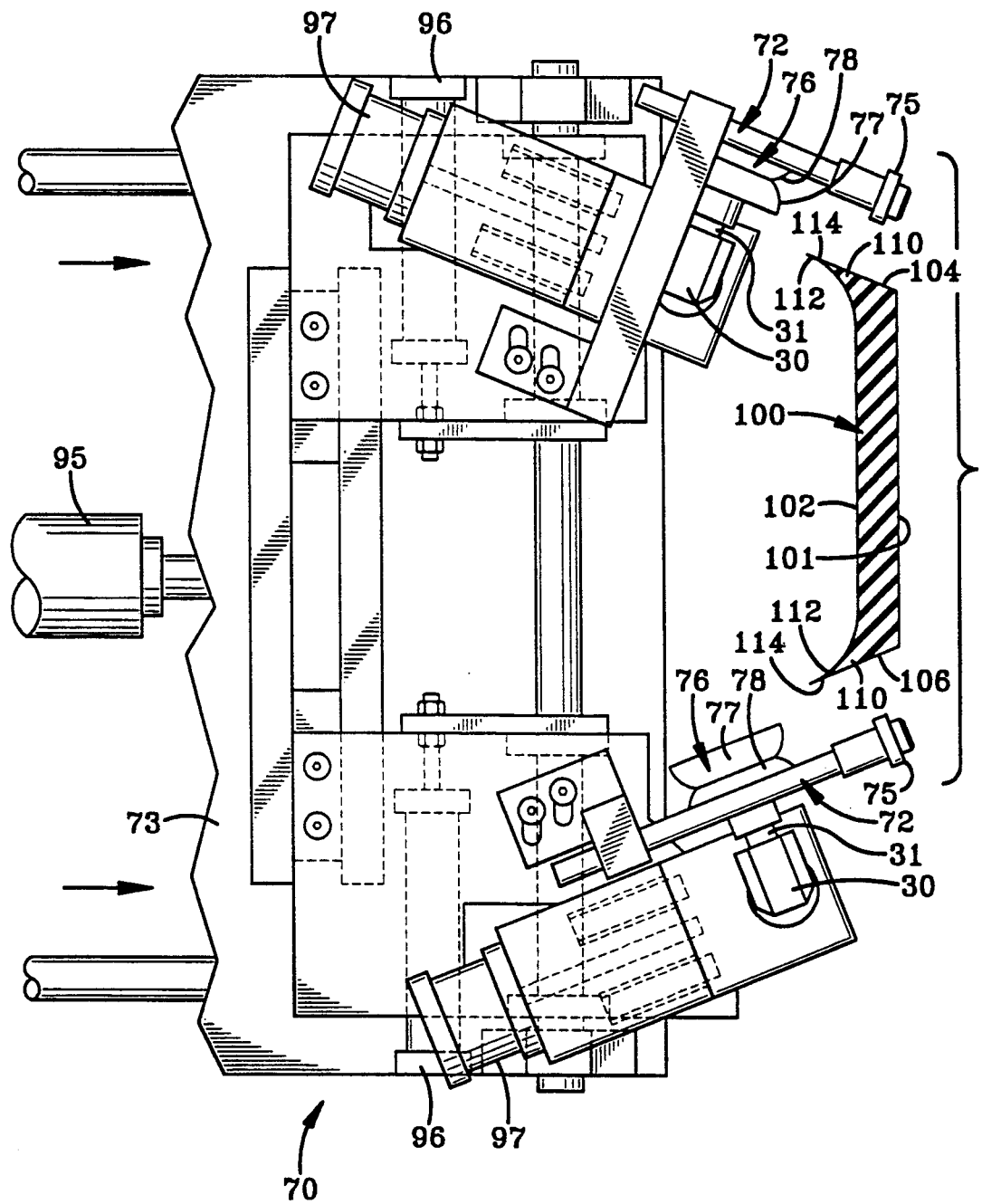
FIG. 4 is a view similar to FIG. 3, depicting the guide means extended.

In operational use, the wing tip or edge grinding assembly 70 is initially retracted relative to the tread 100. The tread 100 is under tension and rotated slowly about the drum 60 and tension roller 200. The guide means 72 is then extended toward the tread 100, but axially spaced from it as shown in FIG. 4. The guide means 72 next is moved axially inward until the rollers 75 contact the tread shoulders 104,106 as shown in FIG. 5. This centers the tread 100, fixes the lateral position, and limits radially inward movement of the tread. All during these steps, the grinding means 76 is in a retracted position.

Figure 6:
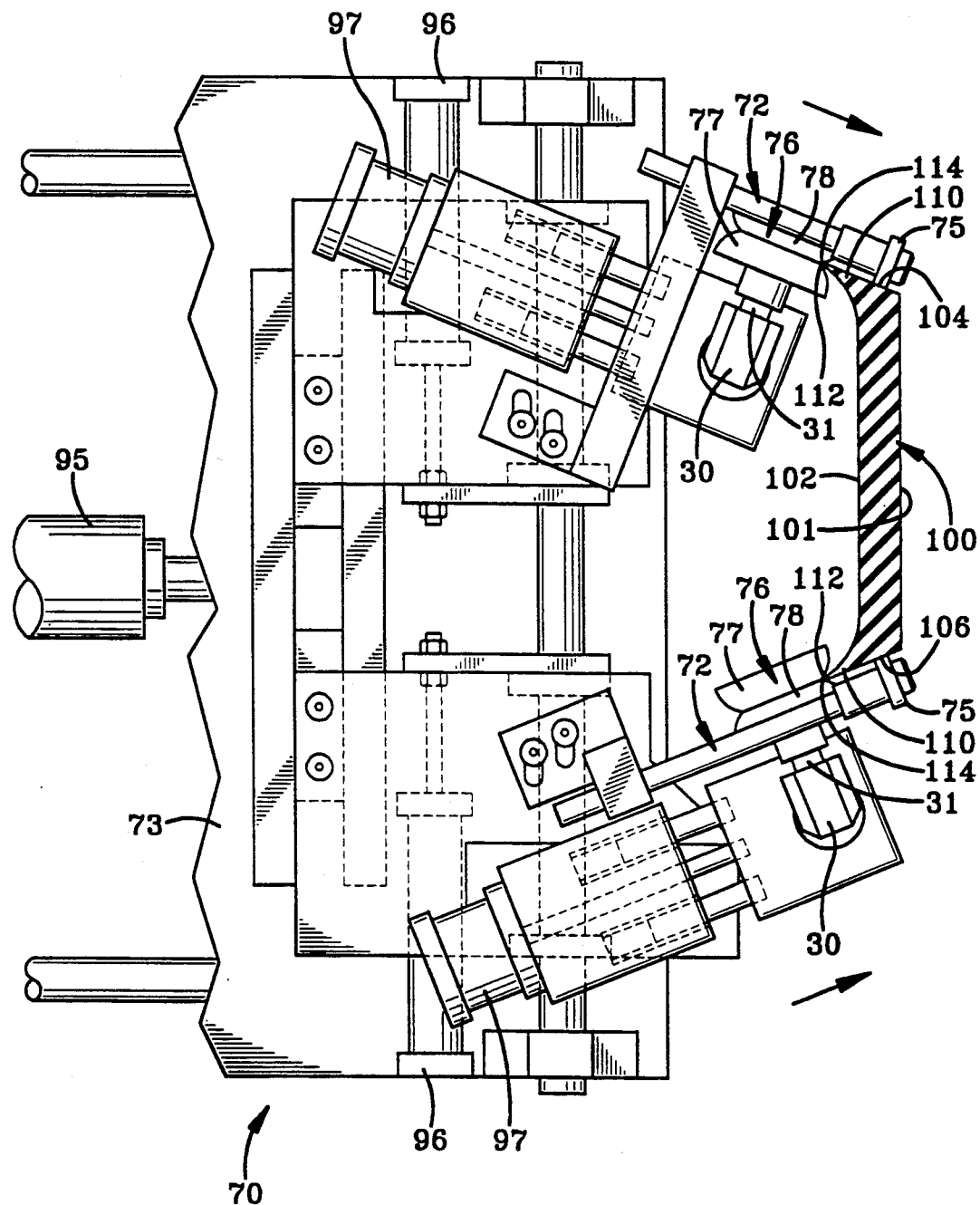
FIG. 6 is a view similar to FIG. 5 depicting the wing tip grinding wheels moved into contact with the wing tips of the tread.

The grinding means 76 has two pairs of juxtaposed grinding wheels 77,78 commonly known as "radiused cup rasps." It has been determined that the use of standard wire brushes simply was inferior to the solid "rigid rasps" in that the wire brushes were rapidly worn and rendered unsuitable for use. The wing tip or edge grinding wheels 77,78 employed in the preferred method have tungsten carbide grit surfaces of approximately the same surface roughness or grit. The tungsten carbide radiused cup rasps are commercially available at suppliers such as Myers Tire Supply, Akron, Ohio, or virtually any other supplier of buffing or grinding equipment. Rasps having similar grit enables the edge or wing tip inner and outer surfaces 112,114 to both be chamfered and roughened substantially the same. Each wheel had a diameter of about 10 cm. Alternatively, the wing tip or edge grinding wheel 77 that contacts the inner surface 112 could be substantially smooth while the outer surface wheel 78 has a grit surface that would roughen the tip or edge at the outer surface 114. This feature would result in the inner surface 112 being unchanged while the outer surface 114 is roughened, the inner wheel 77 acting merely as a support for the edge or flexible wing tip 110. This method of grinding when used in combination with the wing buffing means 80 insures that the buffed grooves of the inner surface of the wing intercept a tread edge, a feature considered highly desirable to assist in air evacuation. Similarly, if both the inner and outer surfaces are ground forming two chamfered surfaces it is believed important that the axially inner surface of the wing should be buffed forming minute axially extending grooves that intersect the chamfered axially inner surface. The grinding wheels 77,78 are connected to shafts 31, each driven or rotated by air motors 30. The wheels 77,78 are rotated at speeds greatly exceeding the tread's rotation speed about the drum 60 and tension roller 200. The tread 100 is rotated counterclockwise about the drum 60 at a speed of about 3 rpm. The wheels 77,78 are rotated clockwise at speeds of about 12,000 rpm. The rotating wheels 77,78 are brought into contact with the edge or wing tip 110 after the guide means 72 are positioned as shown in FIG. 6. Although the guides limit the amount of radially inward movement of the tensioned tread, the tread wing tips or edges are radially unsupported as they traverse through the V-shaped grinding wheels 77,78. This prevents the wheels 77,78 from over grinding the tip or edge and enables the intersection of the surfaces to be ground to a consistent radial location. The direction of rotation of the drum means that edge or wing tip grinding means 70 is located on a slackened side as illustrated. This is preferable to achieve the self-compensating grinding pressure which precludes over grinding of the highly flexible wing tip of winged treads. During this procedure, approximately 5 mm or more of the radial extension of the wing tip is removed and the axially inner and outer surfaces are ground, roughening inwardly at least 5 mm radially around the entire circumference or length of the tread.

The method as described is capable of buffing edges or wing tips of almost any size. The simultaneous supporting and grinding of the axially inner and outer surfaces by the buffing wheels 77,78 permits the grinding of extremely flexible wing tips.

Although one could cut a wing tip to form a chamfered outer surface of a wing tip, it is unlikely that the same degree of surface texturing or the uniformity of location could be achieved as that of the present invention.

Each buffing wheel 77,78 has a concave curvature, by assembling two such wheels 77,78 as shown in the figures, the wheels form a curved "V" shaped grinding surface. As the wing tip 110 traverses through the wheels, the tip is ground such that the axially inner surface 104 and the axially outer surface 106 intersect.

Figure 7A:
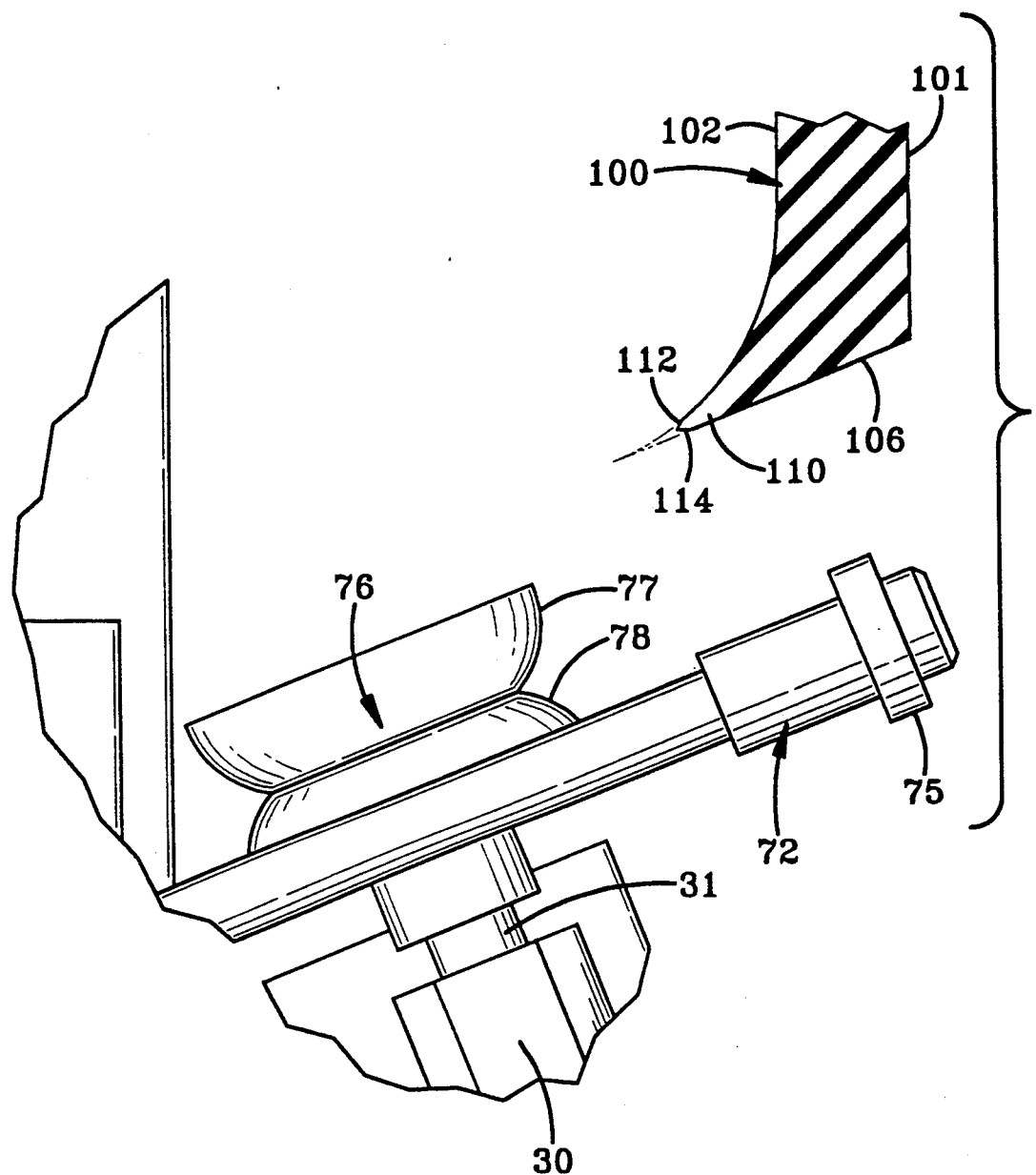
FIG. 7A illustrates a tread wing tip after grinding.
Figure 7B:
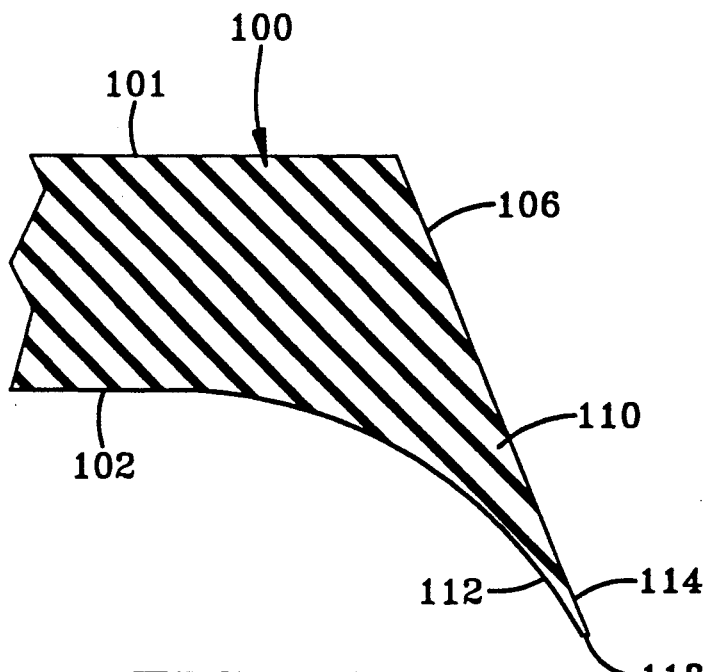
FIG. 7B illustrates a wing tip prior to grinding.
Figure 8:
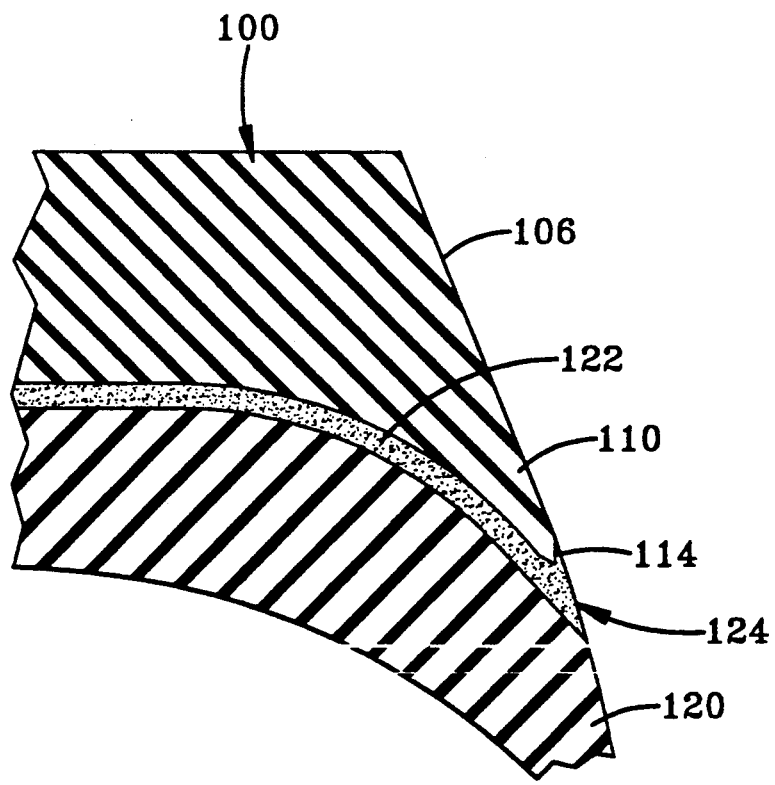
FIG. 8 illustrates a tread wing tip, as ground according to the invention, attached to a tire casing.

In the preferred method, the buffing creates slightly chamfered ground surfaces 112,114. These chamfered and roughened surfaces as shown in FIG. 7 are believed to facilitate bonding of the edge or wing tip 110 to the casing 130. The wing tip 110 when mounted to the casing 130 is located in the upper shoulder region of the tire. This region is subject to constant flexing which can cause the edge or wing tip 110 to lift or separate from the casing 120. By buffing and grinding the tread 100 as shown in FIGS. 7A and 8, the tip can be securely bonded to the casing. This is possible because the unvulcanized cushion gum layer 122 during the vulcanization process becomes a liquid which will flow around the ground tip creating a circumferentially continuous fillet weld 124 of rubber adhering to the roughened tip 110 and effectively locking the wing tip or edge of the tread into place. A prior art winged tread is illustrated in FIG. 7B. This tread had a relatively small flat axial extending surface 118 and an outer surface 114 that was unbuffed. This combination meant that the adhesion of the cushion gum to the outer surface was inferior and that the amount of gum layer that welded the unbuffed tip was substantially reduced.

It has been established that the occurrence of edge or wing tip separation has been dramatically reduced after the employment of this unique wing tip grinding procedure.

It is understood that the method of grinding the edge or wing tip of a precured tread according to the present invention may be employed by a variety of apparatus. It is believed important that the tip be ground along its axially inner and outer surfaces chamfering both surfaces or at least the outer surface 114 such that the surfaces intersect, are roughened creating a textured appearance, and facilitate the creation of a fillet weld 114 of gum rubber upon curing. The fillet weld adheres to the roughened axially outer surface and thereby mechanically locks the tread wing tip or edge to the casing.

What is claimed:

1. A method for removing material from and shaping an edge of a precured tread, the method comprising the steps of:
    a) placing the edge of the tread in a V-shaped groove of a grinding wheel;
    b) rotating the grinding wheel while it is in contact with the tread edge;
    c) moving the tread and grinding wheel relative to one another, the movement being in a direction causing the edge of the tread to be ground to move through the groove in the grinding wheel.

2. The method of claim 1 further comprising the step of:
    d) grinding the axially outer surface of the edge of a precured tread, chamfering and texturing the surface at least 5 mm radially along the length of the tread.

3. The method of claim 1 wherein step a) further comprises the step of :
    a) guiding the tread, thereby aligning the tread edge prior to the edge moving through the V-shaped groove of the grinding wheel.

4. The method of claim 1 comprising the further step of preforming said tread in an annular configuration.

5. The method of claim 4, further comprising the step of turning the annular tread inside out such that the radially inner surface of the tread is radially outward and the ground engaging tread surface is radially inward prior to grinding the edge of the tread.

6. The method of claim 4, further comprising the step of stretching the tread to a predetermined circumferential length prior to grinding the edge.

7. A method for removing material from and shaping a wing tip of a precured winged tread, the wing tip having axially inner and axially outer surfaces, the method comprising the steps of:
    a) placing the wing tip of the tread in a V-shaped groove of a grinding wheel;
    b) rotating the grinding wheel while it is in contact with the tread wing tip;
    c) moving the tread and grinding wheel relative to one another, the movement being in a direction causing the wing rip of the tread to be ground to move through the groove in the grinding wheel.

8. The method of claim 7 further comprising the step of:
    d) grinding the axially outer surface of the wing tip of a precured hinged tread, chamfering and texturing the surface ar least 5 mm radially along the length of the tread.

9. The method of claim 7 wherein step a) further comprises the step of:
   a) guiding the tread, thereby aligning the tread wing tip prior to the wing tip moving through the V-shaped groove of the grinding wheel.

10. The method of claim 7 further comprising the step of:
    d) grinding the axially outer surface of the wing tip of a precured ring tread, chamfering and texturing the axially outer surface at least 5 mm radially along the length of the tread, the axially outer surface intersecting the axially inner surface.

11. The method of claim 10 further comprising the step of:
    d) grinding the axially inner and axially outer surfaces of the wing rip of a precured wing tread, chamfering and texturing both inner and outer surfaces of the wing tip at least 5 mm radially along the length of the tread, the surfaces ground to intersect.

12. The method of grinding of claim 7 comprising the further step of preforming said tread in an annular configuration.

13. The method of claim 7, further comprising the step of turning the annular tread inside out such that the radially inner surface of the tread is radially outward and the ground engaging tread surface is radially inward prior to grinding the edge of the tread.

14. The method of claim 7, further comprising the step of stretching the tread to a predetermined circumferential length prior to grinding the edge.

15. The method of grinding a winged precured tread, the tread having a length said tread having a pair of tread wings, each tread wing having a wing tip having an axially inner surface and an axially outer surface, the method comprises the steps of:
    a) providing an apparatus capable of grinding the axially inner and axially outer surfaces of each of the wing tips of the tread wings, the surfaces formed by the grinding angularly intersecting;
    b) mounting the tread in the apparatus; and
    c) grinding axially inner and axially outer surfaces of each wing tip of the tread.

16. The method of claim 15 wherein the tread length is circumferential and the axially outer wing tip surface is ground in step c) chamfering and roughening the surface creating a roughened area extending at least 5 mm radially along the entire circumferential length of the tread.

17. The method of claim 16 wherein the axially inner wing tip surface is ground in step c) chamfering and roughening the surface creating a roughened area extending at least 5 mm radially along the entire circumferential length of the tread.

* * * * *